April 29, 1952  J. H. SAMMONS  2,594,686
SUPERCHARGER FOR INTERNAL-COMBUSTION ENGINES
Filed Nov. 21, 1947  2 SHEETS—SHEET 1
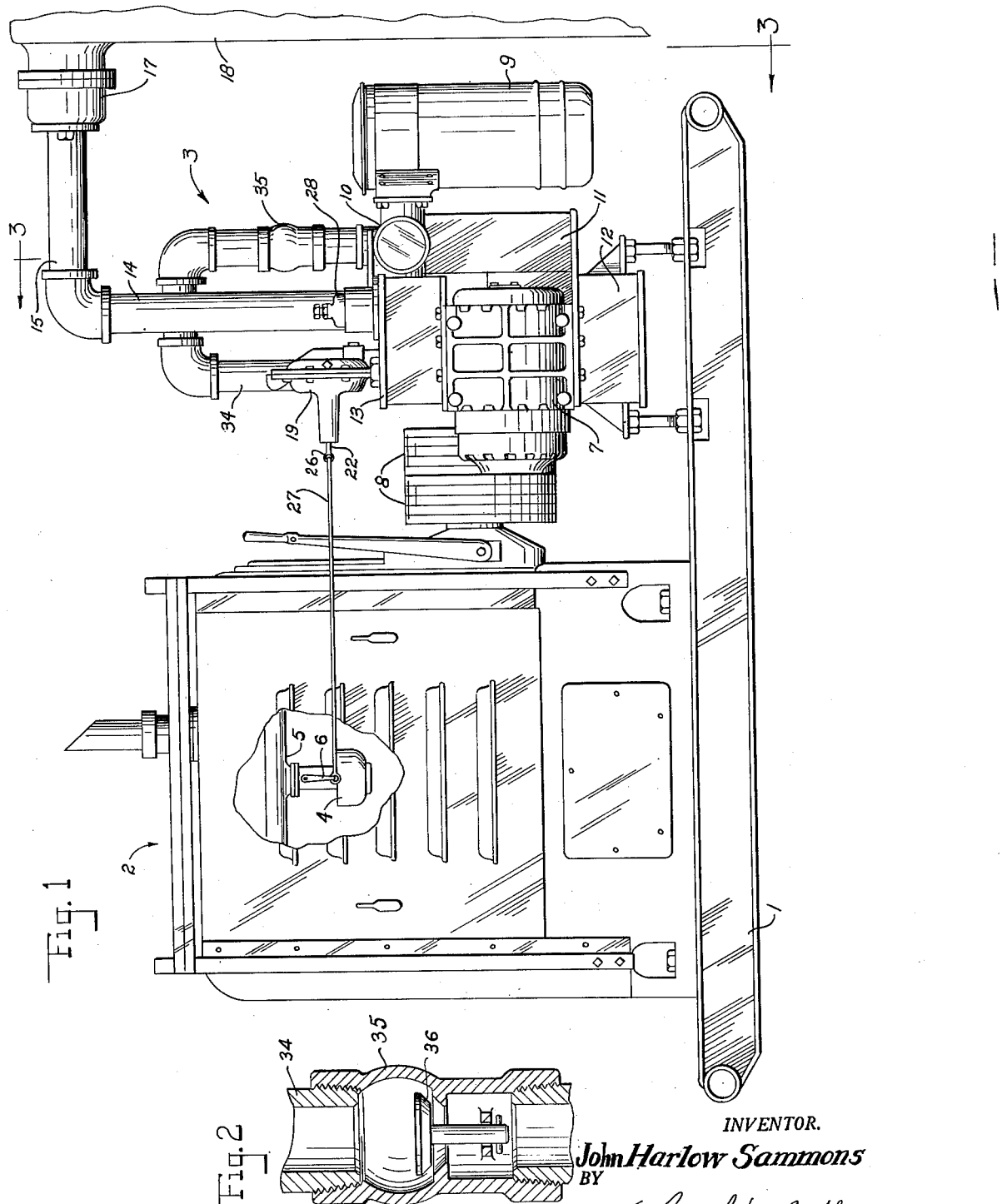
INVENTOR.
John Harlow Sammons
BY
Wayland D. Keith
HIS AGENT April 29, 1952   J. H. SAMMONS   2,594,686
SUPERCHARGER FOR INTERNAL-COMBUSTION ENGINES
Filed Nov. 21, 1947   2 SHEETS—SHEET 2
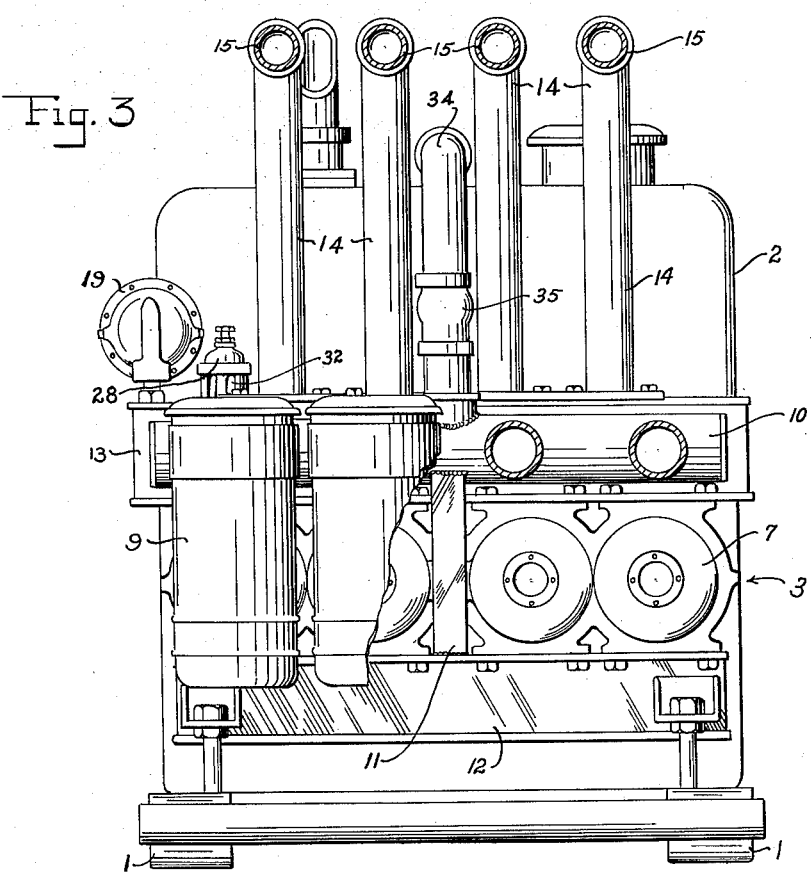
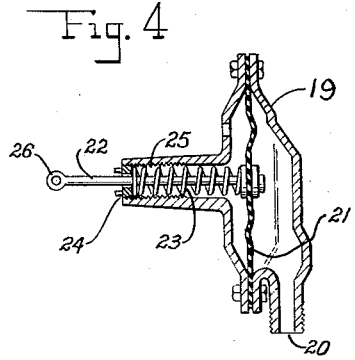
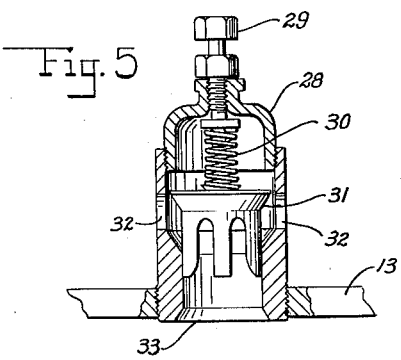
INVENTOR.
John Harlow Sammons
BY
Wayland D. Keith
HIS AGENT Patented Apr. 29, 1952

2,594,686

UNITED STATES PATENT OFFICE 2,594,686

SUPERCHARGER FOR INTERNAL-
COMBUSTION ENGINES

John Harlow Sammons, Wichita Falls, Tex.

Application November 21, 1947, Serial No. 787,312

8 Claims. (Cl. 60—97)

1

This invention relates to improvements in superchargers for internal-combustion engines, and more particularly to superchargers which may be driven independently of the engine being supercharged thereby.

The principle of supercharging an internal-combustion engine to obtain greater power, particularly in high altitudes, has been used extensively, whereby a device such as a blower or compressor is used for increasing the pressure of the air or mixture in the manifold in order to increase the amount of air entering the cylinders during the period of admission by the pumping action of the engine pistons. An engine properly supercharged may have its power increased as much as fifty percent or more at high altitudes.

In the usual practice, heretofore, such superchargers are driven by the engine being supercharged, whereby a considerable variation in pressure is accorded, especially at low engine speeds, which makes the use of such a system somewhat inefficient under certain operating conditions.

The primary object of this invention is to provide for furnishing a uniform pressure for supercharging one or more engines by supercharging apparatus, which is power driven independently of the engine or engines being supercharged.

Another object of this invention is to provide an independently driven supercharger wherein a predetermined maximum pressure to the engine or engines being supercharged may be controlled independently of the speed of the supercharging apparatus.

Another object of this invention is to provide a supercharging apparatus that may be driven independently by an internal-combustion engine for supercharging one or more other internal-combustion engines, in which the speed of the engine driving the supercharger may be controlled automatically by the pressure generated by such supercharger.

A still further object of this invention is to provide an independently driven supercharger unit for supercharging one or more internal-combustion engines, that may be used normally for supercharging such engine or engines, but which, while not in operation, will not impair the normal operation or efficiency of the engine or engines to which it is connected, but will permit the normal operation of such engine or engines while the supercharging unit is not in operation without the necessity for disconnecting the unit therefrom.

2

In the present invention, an independently driven supercharging unit is utilized from which one or more engines may be supercharged and a uniform pressure accorded to the engine or engines being supercharged. Further, provisions have been made by the arrangement herein set forth, whereby the engine or engines normally supercharged may be operated without the use of the supercharger connected therewith and without impairing the normal operation of such engine or engines, and without disconnecting the supercharging unit therefrom.

With the foregoing objects in view, reference is had to the accompanying drawings in which:

Fig. 1 is a side elevation of the supercharger unit and a part of the engine being supercharged, with parts broken away to show the details of construction;

Fig. 2 is a vertical sectional view through a check valve thereof;

Fig. 3 is a partial section taken on the line 3—3 of Fig. 1 looking in the direction indicated by arrows;

Fig. 4 is a vertical sectional view through a pressure governor of the supercharger unit; and Fig. 5 is a vertical sectional view through a relief valve for said supercharger unit.

With more detailed reference to the drawings, the numeral 1 represents a base or frame, upon which a supercharger internal-combustion engine, generally designated by the numeral 2, and a supercharger unit, generally designated by the numeral 3, are mounted. The engine 2 is of the type for conventional internal-combustion of fuel such as gasoline or diesel fuel, and has a carburetor or fuel pump 4, an intake manifold 5, and a throttle control lever 6.

The supercharger comprises two or more sets of blowers 7 of the conventional rotary type, which blowers are driven by the engine 2, as by belt drive 8 connected therewith. The blowers 7 are connected with air cleaners 9 through which air is drawn into the system. The air cleaners 9 are in open communication with the blowers 7 through the conduit 11, and the manifold 10 and an air chest 12 to draw air therethrough upon operation of the blowers.

The air is discharged from each of the blowers 7 into a common air exhaust manifold 13 superposed thereon. Extending upwardly from the air manifold 13 are air supply pipes 14, preferably corresponding in number to the number of engines to be supercharged. One or more of said air supply pipes 14 lead to each of said engines to be supercharged, and extend to an air inlet 15 of an air intake manifold 17 of the engine or engines 18 to be supercharged, thereby forming a passage for air from the blowers 7 through the manifold 13 and air supply pipe 14 to the intake manifold 17 of each engine 18.

The air pressure in the pipes 14 leading to the engine 18 being supercharged must be maintained at a uniform pressure for most efficient operation of the engine; and, to that end, I have provided a governor, generally designated at 19, which is pressure responsive to the air pressure in the exhaust manifold 13 of the supercharger. The air under pressure from the supercharger passes through an opening 20 (Fig. 4) in the housing of the governor 19, and reacts on a diaphragm 21 to move a plunger 22, connected with the diaphragm, against the tension of a compression spring 23. The tension of the spring 23 may be adjusted by a screw-threaded plug 24 which is threadably engaged in an opening 25 in the housing of the pressure governor 19.

The plunger 22 is provided with an eye 26 in a projecting end thereof for connection of this plunger with a throttle control rod 27 extending therefrom to the throttle lever 6, so that upon movement of the diaphragm 21 in accordance with the pressure in the air exhaust manifold 13, the throttle lever 6 of the carburetor or fuel pump 4 is operated to govern the speed of the supercharger engine 2. By this arrangement, the blowers 7 may be operated at approximately the desired speed to give approximately the desired pressure in the pipes 14 leading to fuel supply system of the power engine 18.

However, it is found that due to acceleration and deceleration of the power engine being supercharged, the consumption of air by such power engine varies over a considerable range. Therefore, the blowers 7 must be set to deliver the maximum amount of air to be used by the power engine. When such supercharged engine is operating at speeds requiring less than the maximum output of the blowers 7, a pressure will build up within the air exhaust manifold 13, which pressure will operate the throttle 6 through the governor 19 to reduce the speed of the supercharger engine 2.

A relief valve 28 is provided in the manifold 13, and is adjusted so as to open if the engine or engines being supercharged slows down too much or stalls, which relief valve 28 prevents the pressure from rising too high in the manifold 13, which pressure, in turn, would act on the diaphragm 21 to slow down the supercharger engine too much to where it would stall. By having the throttle of the supercharger engine 2 set to give a minimum idling speed and the relief valve 28 set to open at a pressure only slightly higher than the supercharging pressure, the supercharger engine will continue to run and not stall. This will also take care of any emergency due to the building up of pressure in the manifold 13.

This valve 28 may be of any desired form, one form being shown in Fig. 5, and may be adjusted, as by a screw 29 acting upon a spring 30, so that the check valve member 31 may be controlled to act within the minutely prescribed limits for most efficient operation of the supercharging system. The pressure to open the relief valve 28 is only slightly greater than that maintained for supercharging. The valve 28 is provided with openings 32 in a side thereof to permit the escape of air from the air exhaust manifold 13 to the atmosphere when the valve member 31 is lifted from its seat by the pressure of the air in the manifold.

Occasionally, conditions may arise such as to warrant the operation of the power engine or engines to which this supercharger has been connected, without the use of the supercharger. In that event or in the event of accidental stoppage of the supercharger unit, the air then will be drawn in by the normal suction of the engine 18, through the intake manifold 17, the air inlet pipe 14, exhaust manifold 13 of the supercharger, through a by-pass 34 having a check valve 35, through the air intake manifold 10, and air filters 9 from the atmosphere.

The check valve 35 in the by-pass 34 is provided with a valve member 36 (Fig. 2), so positioned as to be unseated by the normal suction of the engine when the supercharger is not in operation, permitting the air to pass thereby, as described. With the supercharger not in operation, the air will be drawn into the engine in the manner described with but little more resistance than in the fuel supply system of an engine without a supercharger.

Therefore, it will be appreciated readily that the engine 18 may be operated in the normal manner with the supercharger installed as shown in Fig. 1 without the benefits of the supercharger, and upon operation of the supercharger blower 7 the check valve 35 will close automatically by the pressure acting thereon through the pipe 34 from the exhaust manifold 13, and the benefits of supercharging of the engine without the necessity for making any special connections or closing or opening any particular arrangement of valves.

In operation, the device may be connected to the air supply system of one or more engines through pipes 14, which pipes are normally air exhaust pipes from the blowers 7. The supercharger engine 2, which operates the blowers 7 as by belt drive 3, is governed to run at the desired speed and with the pressure governor valve 19, as shown in Fig. 4, adjusted to operate the throttle 6 of the supercharger engine, the latter will drive the blowers 7 to withdraw air from the atmosphere through the air cleaners 9, the air intake manifold 10, the passages 11, and the air chest 12 into the blowers 7. The air is discharged under pressure thereon into the air exhaust manifold 13, and into the pipes 14 leading to the pipe 15, and therethrough into the engine intake manifold 17, for supplying the engine cylinders with air on the intake stroke of the piston to support the combustion of fuel injected thereinto in the normal operation of the engine.

The air pressure created in the manifold 13 by the operation of the blowers 7, will direct a pressure upon the diaphragm 21 to actuate the throttle of the supercharger engine driving the blowers to provide a controlled speed of this engine. However, in case of abnormal operation, the excess pressure generated by the blowers 7 will be expelled through the pressure relief valve 28 so as to maintain a uniform pressure within the pipe or pipes 14 leading to the engine or engines 18.

While this invention has been described with particularity as applied to engines using a diesel principle of fuel injection, it is understood that it may be used with equal advantages to supercharge any type of internal-combustion engine desired, such as gasoline or natural gas or other types of engines using a volatile fuel.

I claim:

1. In a supercharger for internal-combustion engines, the combination with an internal combustion engine, of a plurality of blowers having a common discharge passage, means for driving said blowers independently of said engine, means for directing air under pressure from said blowers through said common discharge passage to the internal combustion engine, means for maintaining a constant air pressure in said blower discharge passage while said supercharger is operating, and further means for directing air into said engine at atmospheric pressure while said supercharger is not operating.

2. In a supercharger for internal-combustion engines, the combination with an internal combustion engine including a fuel supply system having an air intake, of a plurality of blowers, means for driving said blowers independently of said engine, means for directing air under pressure from said blowers to the air intake of the internal-combustion engine, valve means for maintaining a constant air pressure in said air intake while said supercharger is operating, and further means for directing air into said engine at atmospheric pressure while said supercharger is not operating.

3. In a supercharger for internal-combustion engines, the combination with an internal combustion engine including a fuel supply system having an air intake, of a plurality of blowers, means for driving said blowers independently of the engine, means for directing air under pressure from said blowers to the air intake of the internal combustion engine, means for automatically controlling the speed of the blower driving means for maintaining a uniform pressure in said air intake while said supercharger is operating, and further means for directing air into said engine at atmospheric pressure while said supercharger is not operating.

4. In a supercharger for internal-combustion engines, the combination with a plurality of internal combustion engines, each of which engines includes a fuel supply system having an air intake, a plurality of blowers, means for driving said blowers independently of said engines, means for directing air under pressure from said blowers to said air intake of each of said internal-combustion engines, and means responsive to the pressure generated by said blower for automatically controlling the speed of said blower driving means so as to maintain a uniform pressure in said air intake of each of said internal-combustion engines.

5. A supercharger comprising a blower, air intake and discharge chambers connected with the blower in communication therewith, an air discharge pipe extending from the discharge chamber and in communication therewith adapted to direct air therefrom to a power engine, and a conduit connecting the intake and discharge chambers together forming a by-pass around the blower, and means forming a check valve in said conduit to close communication therethrough during operation of the blower.

6. A supercharger comprising a plurality of blowers, a common air intake and a common discharge chamber connected with the blowers in communication therewith, an air discharge pipe extending from the discharge chamber and in communication therewith adapted to direct air therefrom to a power engine, a conduit connecting the intake and discharge chambers together forming a by-pass around the blower, and means forming a check valve in said conduit to close communication therethrough during the operation of the blower, power means for operating said blowers, and means responsive to the pressure in the discharge chamber for controlling the operation of the power means.

7. In a supercharger for internal combustion engines, the combination with an internal combustion engine including a fuel supply system having an air intake pipe, an air manifold connected with the air intake pipe, a plurality of blowers connected with said air manifold and jointly supplying air thereto, a second air manifold, air supply means connected with said second air manifold, and a conduit connecting said manifolds together.

8. In a supercharger for internal combustion engines, the combination with an internal combustion engine including a fuel supply system having an air intake pipe, an air manifold connected with the air intake pipe, a plurality of blowers connected with said air manifold and jointly supplying air thereto, a second air manifold, air supply means connected with said second air manifold, a conduit connecting said manifolds together, and a check valve in said conduit arranged for air flow from the second manifold to the first-mentioned manifold.

JOHN HARLOW SAMMONS.

REFERENCES CITED

The following references are of record in the file of this patent:

UNITED STATES PATENTS

| Number | Name | Date |
|---|---|---|
| 1,008,863 | Reuter | Nov. 14, 1911 |
| 1,080,624 | Diesel | Dec. 9, 1913 |
| 1,375,931 | Rateau | Apr. 26, 1921 |
| 2,385,366 | Lysholm | Sept. 25, 1945 |
| 2,403,398 | Reggio | July 2, 1946 |

FOREIGN PATENTS

| Number | Country | Date |
|---|---|---|
| 184,378 | Switzerland | Aug. 1, 1936 |